US006899197B2

(12) United States Patent
Arian et al.

(10) Patent No.: US 6,899,197 B2
(45) Date of Patent: May 31, 2005

(54) METHOD AND APPARATUS FOR ABSORBING ACOUSTIC ENERGY

(75) Inventors: Abbas Arian, Houston, TX (US); Laurence T. Wisniewski, Houston, TX (US); Georgios L. Varsamis, Houston, TX (US); Gary L. Fickert, Houston, TX (US)

(73) Assignee: Dresser Industries, Inc., Dallas, TX (US)

( * ) Notice: Subject to any disclaimer, the term of this patent is extended or adjusted under 35 U.S.C. 154(b) by 0 days.

(21) Appl. No.: 10/252,347

(22) Filed: Sep. 23, 2002

(65) Prior Publication Data

US 2003/0052185 A1 Mar. 20, 2003

Related U.S. Application Data

(63) Continuation of application No. 09/160,112, filed on Sep. 24, 1998, now Pat. No. 6,564,899.

(51) Int. Cl.⁷ ............................. G01V 1/52; G01V 1/40; G01V 1/04; G01V 1/16
(52) U.S. Cl. ..................... 181/102; 181/108; 181/113; 181/122
(58) Field of Search ............................. 181/102, 104, 181/106, 108, 111, 112, 113, 122, 208, 401

(56) References Cited

U.S. PATENT DOCUMENTS

| | | | |
|---|---|---|---|
| 2,918,651 A | 12/1959 | Podolak et al. ................ | 340/8 |
| 3,188,607 A | 6/1965 | Woodworth .................. | 340/17 |
| 3,363,118 A | 1/1968 | Sims ........................... | 310/8.7 |
| 3,608,373 A | * 9/1971 | Youmans ...................... | 367/33 |
| 3,930,217 A | 12/1975 | Wiley ......................... | 340/15.5 |
| 4,131,875 A | 12/1978 | Ingram ....................... | 340/15.5 |
| 4,319,345 A | 3/1982 | Dennis ........................ | 367/25 |
| 4,562,557 A | 12/1985 | Parks et al. ................... | 367/27 |
| 4,594,691 A | 6/1986 | Kimball et al. ............... | 367/32 |
| 4,606,014 A | 8/1986 | Winbow et al. .............. | 367/75 |
| 4,649,525 A | 3/1987 | Angona et al. ................. | 1/40 |
| 4,658,383 A | 4/1987 | Zimmer ...................... | 367/29 |
| 4,665,511 A | 5/1987 | Rodney et al. ............... | 367/35 |
| 4,698,791 A | 10/1987 | Cunningham ................ | 367/25 |
| 4,703,460 A | 10/1987 | Kurkjian et al. .............. | 367/31 |
| 4,791,619 A | 12/1988 | Liu ............................. | 367/35 |
| 4,825,117 A | 4/1989 | Thomas, III et al. ........... | 41/8 |

(Continued)

*Primary Examiner*—Edgardo San Martin
(74) *Attorney, Agent, or Firm*—Conley Rose, P.C.

(57) ABSTRACT

An acoustic logging tool including an elongated body, one or more acoustic transmitters, one or more acoustic receivers, and a broadband acoustic absorption region. A substantial portion of the broadband acoustic absorption region is between the transmitter and the receiver. The acoustic energy absorber includes a first absorber for absorbing a first mode of acoustic energy and a second absorber for absorbing a second mode of acoustic energy. The acoustic absorption material used to make the acoustic absorbers has an acoustic impedance between 20% and 120% of the material used to construct the acoustic logging tool. The acoustic logging tool includes an elongated hollow tool body, an insert configured to be inserted into the tool body, and a ring configured to be inserted onto the insert. A first element is supported by the ring and exposed to a pressure field, and a second element is supported by the ring and exposed to a pressure field. The first element and the second element translate pressure from outside the tool body to the ring. The first element is supported on the opposite side of the ring from the second element, so that pressure translated to the ring by the first element substantially cancels the pressure translated to the ring by the second element. The ring substantially acoustically isolates the first and second element from the tool body and the insert.

23 Claims, 17 Drawing Sheets

U.S. PATENT DOCUMENTS

| | | | |
|---|---|---|---|
| 4,845,616 A | | 7/1989 | Phillips ........................ 364/422 |
| 4,872,526 A | * | 10/1989 | Wignall et al. ............. 181/102 |
| 4,899,844 A | | 2/1990 | Katahara et al. ............ 181/106 |
| 4,951,267 A | | 8/1990 | Chang et al. .................. 367/31 |
| 5,027,331 A | | 6/1991 | Winbow et al. ............... 367/75 |
| 5,036,945 A | * | 8/1991 | Hoyle et al. ................. 181/104 |
| 5,044,461 A | | 9/1991 | Aronstam ........................ 1/40 |
| 5,063,542 A | | 11/1991 | Petermann et al. .......... 367/166 |
| 5,170,018 A | | 12/1992 | Potier |
| 5,229,553 A | * | 7/1993 | Lester et al. ................. 181/102 |
| 5,229,939 A | | 7/1993 | Scheibner et al. ........... 364/422 |
| 5,265,067 A | | 11/1993 | Chang ........................... 367/31 |
| 5,343,001 A | * | 8/1994 | Cowles et al. .............. 181/102 |
| 5,357,481 A | | 10/1994 | Lester et al. ................... 367/31 |
| 5,387,767 A | | 2/1995 | Aron et al. ..................... 367/25 |
| 5,398,215 A | | 3/1995 | Sinha et al. .................... 367/31 |
| 5,475,650 A | | 12/1995 | Sinha et al. .................... 367/31 |
| 5,510,582 A | * | 4/1996 | Birchak et al. ............. 181/102 |
| 5,521,882 A | | 5/1996 | D'Angelo et al. ............ 367/32 |
| 5,544,127 A | | 8/1996 | Winkler ......................... 367/27 |
| 5,644,186 A | | 7/1997 | Birchak et al. ............. 310/337 |
| 5,728,978 A | * | 3/1998 | Roberts et al. ............. 181/102 |
| 5,780,784 A | | 7/1998 | Robbins ..................... 181/102 |
| 5,796,677 A | | 8/1998 | Kostek et al. ................. 367/25 |
| 5,852,262 A | * | 12/1998 | Gill et al. .................... 181/106 |
| 6,082,484 A | * | 7/2000 | Molz et al. .................. 181/102 |
| 6,643,221 B1 | * | 11/2003 | Hsu et al. .................... 181/102 |

* cited by examiner

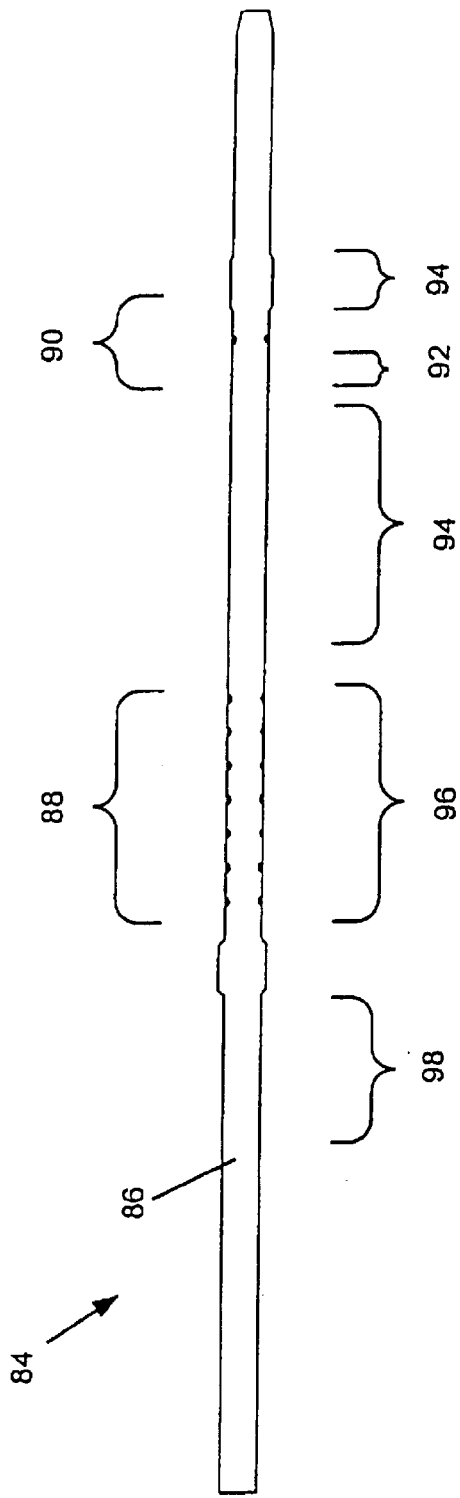
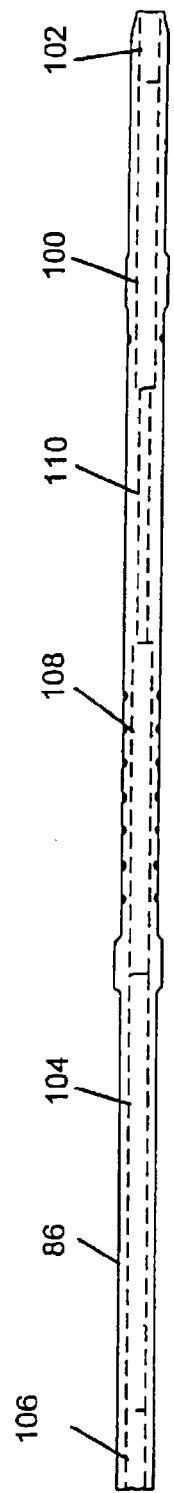

METHOD AND APPARATUS FOR ABSORBING ACOUSTIC ENERGY

This application is a continuation application based on U.S. patent application Ser. No. 09/160,112, filed Sep. 24, 1998 and issued as U.S. Pat. No. 6,564,899.

This invention relates generally to a method and apparatus utilized in hydrocarbon exploration. More specifically the invention relates to the utilization of acoustic sources and receivers to determine acoustic properties of geologic formations as they are traversed by a logging tool, be it a wireline logging tool or a logging while drilling tool. More particularly the present invention is directed to methods and apparatus for providing acoustic isolation between an acoustic transmitter and an acoustic receiver.

BACKGROUND OF THE INVENTION

Geologists and geophysicists are interested in the characteristics of the formations encountered by a drill bit as it is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed or a core can be bored along the entire length of the borehole. Alternatively, the drill bit can be withdrawn from the borehole and a "wireline logging tool" can be lowered into the borehole to take measurements. In still another approach, called "measurement while drilling" ("MWD") or "logging while drilling" ("LWD"), tools make measurements in the borehole while the drill bit is working.

An acoustic logging tool collects acoustic data regarding underground formations. The purpose of such a tool is to measure the "interval transit time" or the amount of time required for acoustic energy to travel a unit distance in a formation. In simple terms, this is accomplished by transmitting acoustic energy into the formation at one location and measuring the time that it takes for the acoustic energy to travel to a second location or past several locations. To improve the ability of an acoustic tool to detect the signal at the receiver, the detected signal should be effectively free of acoustic energy coupled from the transmitter to the tool body between the transmitter and the receiver and propagated to the receiver.

SUMMARY OF THE INVENTION

In general, in one aspect, the invention features an acoustic logging tool comprising an elongated body, one or more acoustic transmitters, one or more acoustic receivers, and a broadband acoustic absorption region. A substantial portion of the broadband acoustic absorption region is between the transmitter and the receiver.

In general, in another aspect, the invention features an acoustic logging tool comprising an elongated body, an acoustic transmitter, an acoustic receiver, and an acoustic energy absorber. The acoustic energy absorber comprises a first absorber for absorbing a first mode of acoustic energy and a second absorber for absorbing a second mode of acoustic energy.

Implementations of the invention may include one or more of the following. The first absorber may comprise one or more toroidal-shaped elements. The second absorber may comprise one or more elongated elements. The elongated elements may be inserted into the body. Each elongated element of the second absorber may be inserted into the body tangent to an arc centered on a longitudinal axis of the body, the arc having a radius smaller than an outside diameter of the body.

A projection of the elongated elements onto a plane perpendicular to a longitudinal axis of the body may cover between 10 and 70 percent of the cross section of the body. A line drawn through the body parallel to the longitudinal axis of the body may intersect more than one elongated element.

The body may comprise an elongated hollow cylinder and an insert configured to be inserted into the cylinder. The acoustic transmitter may be mounted on a ring which substantially acoustically decouples the acoustic transmitter from the tool body and the insert by one or more air gaps. The acoustic transmitter may be mounted on a ring which substantially acoustically decouples the acoustic transmitter from the tool body and the insert by one or more elastomeric contacts. The acoustic receiver may be mounted on a ring which substantially acoustically decouples the acoustic receiver from the tool body and the insert by one or more air gaps. The acoustic receiver is mounted on a ring which substantially acoustically decouples the acoustic receiver from the tool body and the insert by one or more elastomeric contacts. The acoustic transmitter may be substantially acoustically decoupled from the body by one or more air gaps and the acoustic receiver may be substantially acoustically decoupled from the body by one or more air gaps. The acoustic transmitter may be substantially acoustically decoupled from the body by one or more elastomeric contacts, and the acoustic transmitter may be substantially acoustically decoupled from the body by one or more elastomeric contacts.

The acoustic noise energy absorption element may be bonded to the receiver portion of the insert. The acoustic noise energy absorption element may be located so as to absorb acoustic noise energy traveling from the electronics portion toward the acoustic receiver.

In general, in another aspect, the invention features an acoustic logging tool comprising an elongated body having a top (first end) and a bottom (second end), an acoustic transmitter, and an acoustic receiver at a distance from the bottom (second end) of the body less than the distance from the bottom (second end) to the acoustic transmitter. The acoustic logging tool further comprises an acoustic energy absorber configured to absorb acoustic energy traveling toward the acoustic receiver from the direction of the bottom (second end) of the body.

In general, in another aspect, the invention features an acoustic energy absorption element for use in an acoustic logging tool comprising a material having an acoustic impedance between 20% and 120% of the material used to construct the acoustic logging tool.

Implementations of the invention may include one or more of the following. The material may comprise a metallic particles/bonding material compound. The metallic particles/bonding material compound may have a specific gravity between 2 and 25. The metallic particles/bonding material compound may have a specific gravity between 8 and 15. The acoustic absorption element may have an elongated shape. The acoustic absorption element may have a toroidal shape. The acoustic absorption element may have a cylindrical shape.

In general, in another aspect, the invention features an acoustic logging tool comprising an elongated body, an acoustic transmitter, an acoustic receiver, and an acoustic energy absorption element conformed to the shape of the body.

Implementations of the invention may include one or more of the following. The acoustic energy absorption element may be conformed to the shape of a cavity formed by the body. The acoustic energy absorption element may be the same size as the cavity. The acoustic energy absorption element may be larger than the cavity and may have to be compressed to fit in the cavity. A band may be configured to compress the acoustic absorption element. The band may be substantially not in contact with the body. The body may support the band if the band is struck. The band may comprise a key configured to fit in a notch in the body. The band may have a smaller diameter than the body. The band may have the same diameter as the body.

The acoustic energy absorption element may be elongated. The acoustic energy absorption element may be compressed along an axis of elongation.

In general, in another aspect, the invention features an acoustic logging tool comprising an elongated hollow tool body, an insert configured to be inserted into the tool body, and a ring configured to be inserted onto the insert. A first element is supported by the ring and exposed to a pressure field, and a second element is supported by the ring and exposed to a pressure field. The first element and the second element translate pressure from outside the tool body to the ring. The first element is supported on the opposite side of the ring from the second element, so that pressure translated to the ring by the first element substantially cancels the pressure translated to the ring by the second element.

In general, in another aspect, the invention features an acoustic logging tool comprising an elongated hollow tool body, an insert configured to be inserted onto the tool body, a ring configured to be inserted onto the insert, a first acoustic element supported by the ring, and a second acoustic element supported by the ring.

Implementations of the invention may include one or more of the following. The ring may be substantially isolated from the insert through air gaps. The ring may be substantially isolated from the insert through elastomeric elements. The first element may be a transmitter. The second element may be a transmitter. The second element may be a plug. The first element may be a receiver. The second element may be a plug. The acoustic logging tool may comprise an insert configured to be inserted into the tool body, the ring configured to fit around the insert, and the insert, tool body and ring may be positioned to have substantially no metal contact between the ring and the tool body and between the ring and the insert.

In general, in another aspect, the invention features an insert for use in an acoustic logging tool comprising a tool body, the insert being inserted in the tool body, the insert comprising a transmitter portion for supporting an acoustic transmitter, the acoustic transmitter being mounted on a ring, the ring substantially acoustically decoupling the acoustic transmitter from the insert.

An acoustic noise energy absorber may be supported by the insert. The insert may comprise an electronics portion for supporting an electronics package.

In general, in another aspect, the invention features an insert for use in an acoustic logging tool comprising a tool body, the insert being inserted in the tool body. The insert comprises a receiver portion for supporting an acoustic receiver, the acoustic receiver being mounted on a ring, the ring substantially acoustically decoupling the acoustic receiver from the insert.

Implementations of the invention may include one or more of the following. An acoustic noise energy absorber may be supported by the insert.

In general, in another aspect, the invention features a method for absorbing acoustic energy traveling through a body, the body being part of an acoustic logging tool, the method comprising conforming an acoustic energy absorption element to the body.

Implementations of the invention may include one or more of the following. The method may include compressing the acoustic energy absorption element.

In general, in another aspect, the invention features a method for acoustic logging comprising transmitting acoustic energy from an acoustic transmitter through a body. The method includes absorbing at least a portion of the acoustic energy traveling through the body in a first mode using a first absorber and absorbing at least a portion of the acoustic energy traveling through the body in a second mode using a second absorber.

In general, in another aspect, the invention features a method for acoustic logging using an acoustic logging tool comprising an elongated hollow tool body, an insert inserted into the tool body, an acoustic transmitter supported by the insert and an acoustic receiver supported by the insert. The method comprises acoustically decoupling the acoustic receiver from the insert by mounting the acoustic receiver on a receiver ring.

Implementations of the invention may include one or more of the following. The decoupling may be accomplished by one or more air gaps. The decoupling may be accomplished by elastomeric elements. The method may comprise substantially acoustically decoupling the acoustic transmitter from the insert by mounting the acoustic transmitter on a ring, the ring having one or more air gaps. The method may comprise substantially acoustically decoupling the acoustic transmitter from the insert by mounting the acoustic transmitter on a ring, the ring having one or more elastomeric elements.

In general, in another aspect, the invention features a method for acoustic logging using an acoustic logging tool comprising an elongated hollow tool body comprising a tool body material, an insert inserted into the tool body, an acoustic transmitter supported by the insert and an acoustic receiver supported by the insert. The method comprises blending metallic particles and a bonding element into a compound having acoustic impedance between 10% and 120% of the acoustic impedance of the tool body material, and conforming the blended compound to the tool body.

Implementations of the invention may include one or more of the following. Conforming may comprise conforming the blended compound to a cavity formed by the tool body. The method may comprise compressing the blended compound.

In general, in another aspect, the invention features a method for absorbing acoustic energy in a transmission medium comprising suspending particles of a first material having a first specific gravity in a matrix of a second material having a second specific gravity.

Implementations of the invention may include one or more of the following. The method may further comprise adjusting the acoustic impedance of the combined first and second material to match the acoustic impedance of the transmission medium. The absorbing material may be used to absorb acoustic energy in a logging tool. The logging tool may be an acoustic logging tool.

In general, in another aspect, the invention features an acoustic logging tool comprising an elongated body, an acoustic transmitter, an acoustic receiver, and an acoustic energy absorber supported by the body. The acoustic logging tool comprises a first absorber for absorbing flexural acoustic energy, and a second absorber for absorbing compressional acoustic energy.

Implementations of the invention may include one or more of the following. The first absorber may comprise one or more toroidal-shaped elements. The second absorber may comprise one or more elongated elements. The elongated elements are inserted into the body. Each elongated element of the second absorber may be inserted into the body tangent to an arc centered on a longitudinal axis of the body, the arc having a radius smaller than an outside diameter of the body. A projection of the elongated elements onto a plane perpendicular to a longitudinal axis of the may cover between 10 and 70 percent of the cross section of the body. A line drawn through the body parallel to the longitudinal axis of the body may intersect more than one elongated element. The first absorber may be placed substantially at the region of the body where the flexural acoustic energy is prevalent. The first absorber may be placed substantially adjacent to the transmitter. The second absorber may be placed substantially at the region of the body where the compressional acoustic energy is prevalent. The first absorber may be placed substantially adjacent to the receiver. The second absorber may be placed next to or at a distance from the first absorber and between the transmitter and the receiver. The presence of the first absorber may enhance the effectiveness of the second absorber.

In general, in another aspect, the invention features an acoustic logging tool comprising an elongated body, an acoustic transmitter, an acoustic receiver, and an acoustic energy absorber. The acoustic energy absorber comprises a first absorber for absorbing a first mode of acoustic energy, and a second absorber for absorbing a second mode of acoustic energy.

BRIEF DESCRIPTION OF THE DRAWING

FIG. 7 is a perspective view of the acoustic logging tool of the present invention.

FIG. 8 is a perspective view of the acoustic logging tool of the present invention showing an insert.

DESCRIPTION OF THE PREFERRED EMBODIMENTS

Figure 1:
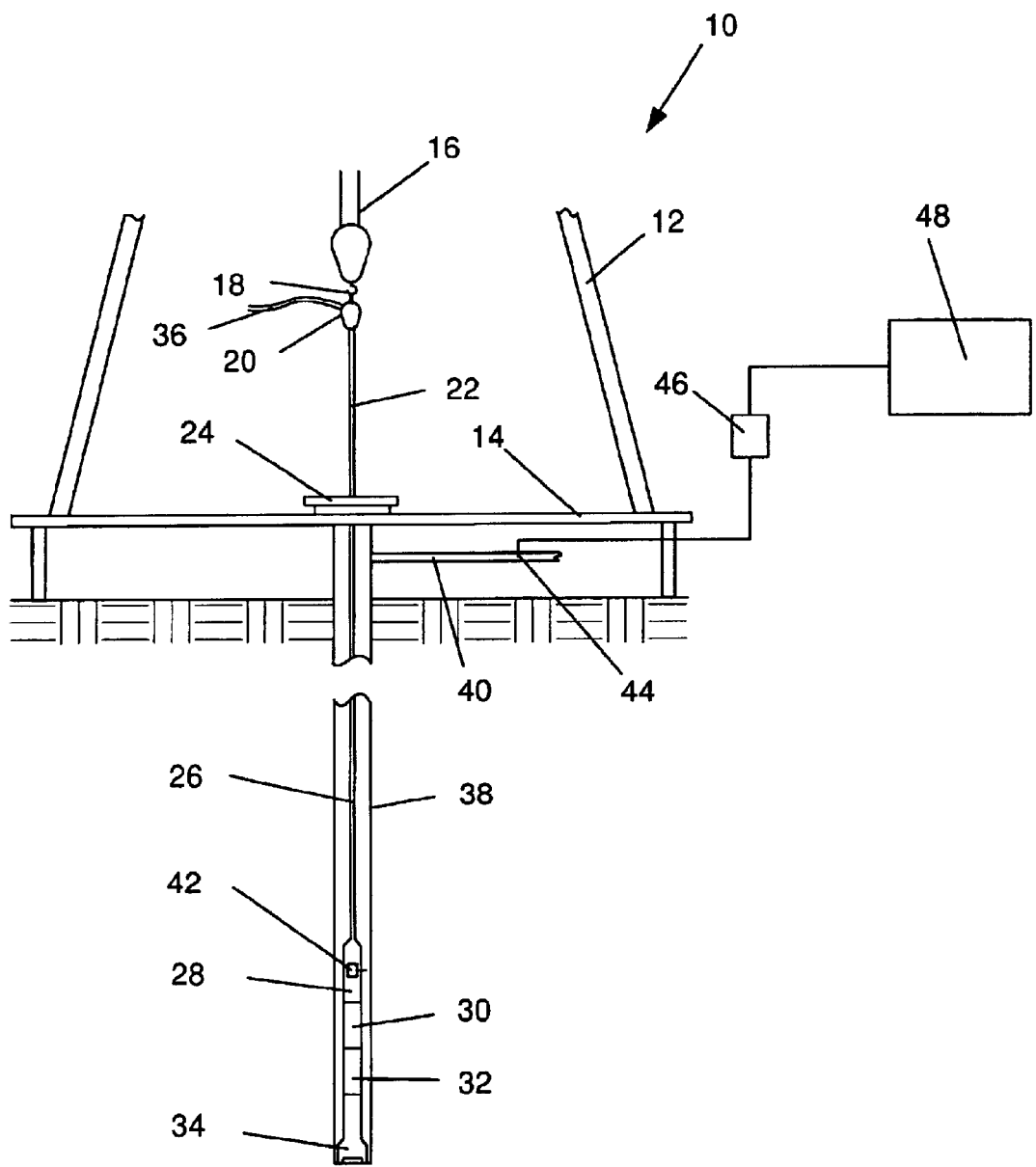
FIG. 1 is an illustration of a logging while drilling system incorporating an acoustic logging while drilling tool of the present invention.

A drilling rig 10 (simplified to exclude items not important to this application) comprises a derrick 12, derrick floor 14, draw works 16, hook 18, swivel 20, kelly joint 22, rotary table 24, drillstring 26, drill collar 28, LWD tool 30, LWD acoustic logging tool 32 and drill bit 34, as shown in FIG. 1. Mud is injected into the swivel by a mud supply line 36. The mud travels through the kelly joint 22, drillstring 26, drill collars 28, and LWD tools 30 and 32 and exits through ports in the drill bit 34. The mud then flows up the borehole 38. A mud return line 40 returns mud from the borehole 38 and circulates it to a mud pit (not shown) and back to the mud supply line 36.

The data collected by the LWD tools 30 and 32 is returned to the surface for analysis by telemetry transmitted through the drilling mud. A telemetry transmitter 42 located in a drill collar or in one of the LWD tools collects data from the LWD tools and modulates the data onto a carrier which can be transmitted through the mud. A telemetry sensor 44 on the surface detects the telemetry and returns it to a demodulator 46. The demodulator 46 demodulates the data and provides it to computing equipment 48 where the data is analyzed to extract useful geological information.

In a similar embodiment after the well has been drilled a wireline tool can be lowered in the borehole 38 suspended by a long electrical cable. The cable is used both to provide power to the tool and to communicate data back to the surface. All aspects of the current invention apply equally to MWD tools and to wireline tools. For ease of description the described embodiment will be that of an MWD tool.

Figure 2:
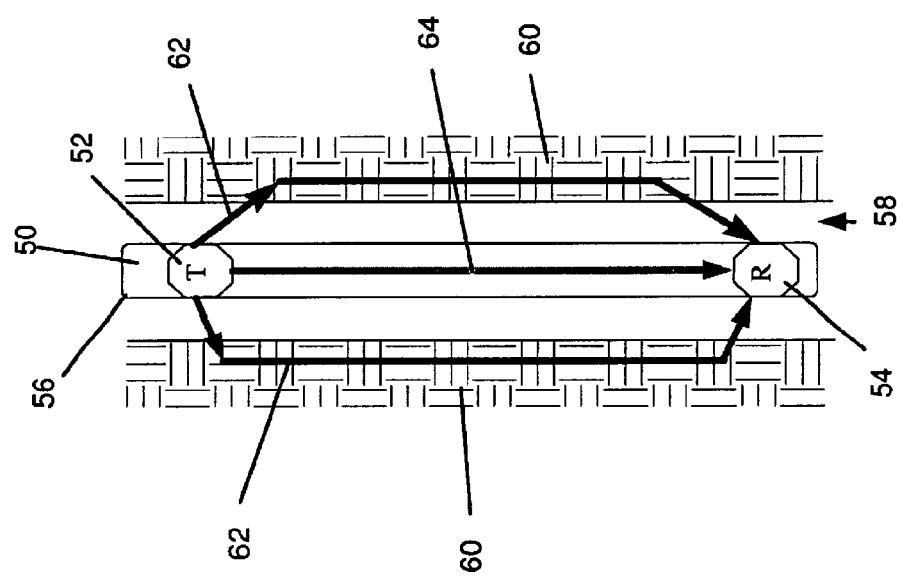
FIG. 2 is a representation of a prior art acoustic logging tool.

A prior art acoustic logging tool 50 has an acoustic transmitter 52 and an acoustic receiver 54 supported by a body 56, as shown in FIG. 2. The acoustic logging tool 50 can be part of a drill string (not shown), or it can be suspended from a wireline cable (not shown) inserted in a borehole 58 through a formation 60. The acoustic transmitter 52 emits acoustic energy 62 into the formation 60. The acoustic energy 62 is refracted and travels through the formation 60 along the borehole 58 and more specifically along the borehole/formation interface. As it travels along the borehole 58, a portion of the acoustic energy 62 is emitted back into the borehole 58 where it is detected by the acoustic receiver 54. By measuring the elapsed time from the transmission of the acoustic energy 62 by the acoustic transmitter 52 to the receipt of the acoustic energy by the acoustic receiver 54 and processing the measurement, the "slowness" of the formation can be derived. Slowness is defined as the inverse of the velocity of the wave. Using the derived slowness of the formation and formation measurements made by other tools, a variety of formation characteristics can be derived.

Some acoustic energy 64 emitted by the acoustic transmitter 52 is transmitted into the body 56 of the acoustic logging tool 50 and travels along the body 56 to the acoustic receiver 54. The receipt of the acoustic energy 64 that travels along the body interferes with the acoustic energy 62 transmitted through the formation 60, making the "slowness" calculation more difficult or even impossible to perform.

Acoustic energy travels through the body of an acoustic logging tool primarily in two modes: (a) a flexural mode; and (b) a compressional mode. The energy associated with the modes of transmission attenuates as the energy moves away from the acoustic transmitter, but the energy associated with the flexural mode attenuates more quickly than the energy associated with the compressional mode. The inventors have discovered that the acoustic energy propagation mode changes (a "mode conversion" takes place) as the acoustic energy travels through the body of the tool. The inventors have further discovered that the prime mode of transmission is flexural near the transmitter, changing to compressional as the distance from the transmitter increases.

Figure 3:
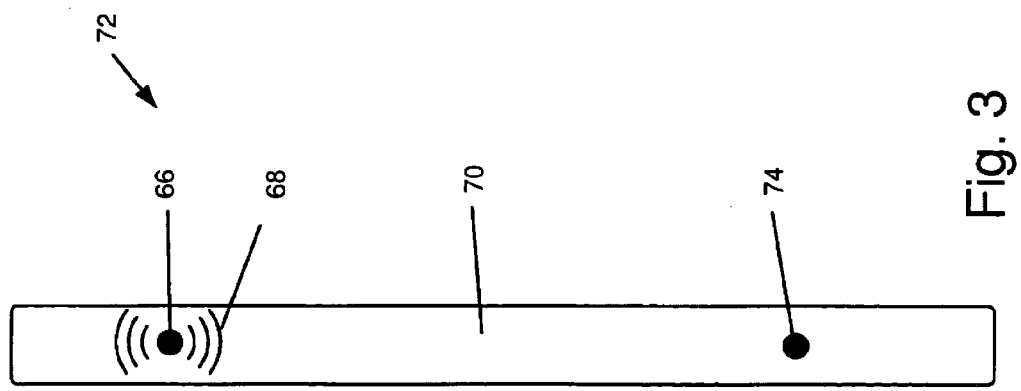

This is illustrated in FIGS. 3–6. An acoustic transmitter 66 emits acoustic energy 68 into the body 70 of the acoustic logging tool 72, as shown in FIG. 3. Some of the acoustic energy emitted by the acoustic transmitter travels into the formation, as shown in FIG. 2, but some of it travels along the body 70 of the acoustic logging tool 72, as shown in FIG. 3. A portion of the acoustic energy traveling in the body 70 of the acoustic logging tool 72 travels toward an acoustic receiver 74. This energy if left unattenuated will "mask" the signal received at the receiver from the formation.

Figure 4:
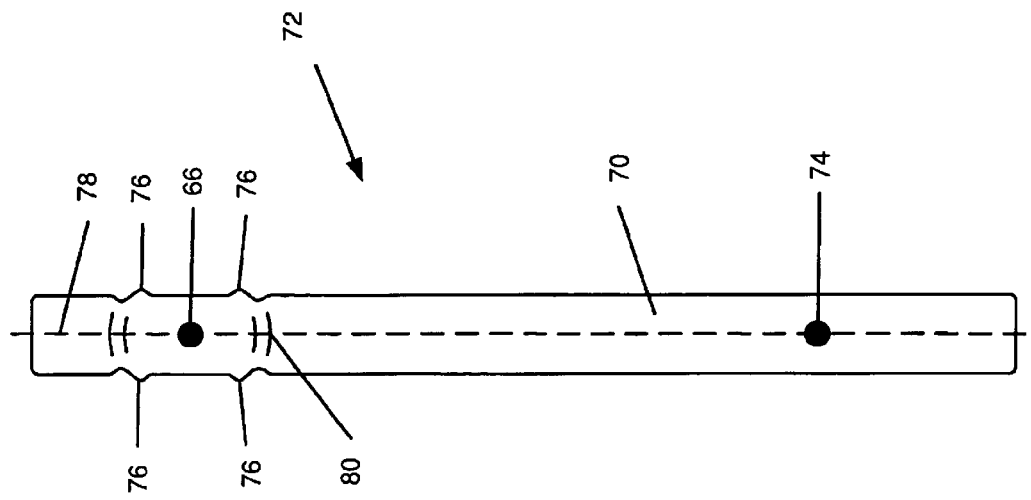
FIGS. 3, 4, 5, and 6 are representations of acoustic energy traveling in an acoustic logging tool.

The acoustic energy 68 travels along the body 70 in two modes, as shown in FIG. 4. The first mode 76 is a "flexural" mode, which causes vibrations in the body 70 of the acoustic logging tool which are substantially perpendicular to a longitudinal axis 78 through the body of the tool. In other terms, the wave front of the flexural mode travels substantially parallel to the longitudinal axis 78 through the body of the tool. The second mode 80 is a "compressional" mode, which causes vibrations in the body 70 of the acoustic logging tool 72 which are substantially parallel to the tool's longitudinal axis 78. In other terms, the wave front of the compressional mode travels substantially perpendicular to the longitudinal axis 78 through the body of the tool. The flexural mode of acoustic energy 76 travels in a way that is greatly affected by the outer surface of the body 70 while the compressional mode of acoustic energy 80 travels primarily inside the body 70.

Figure 5:
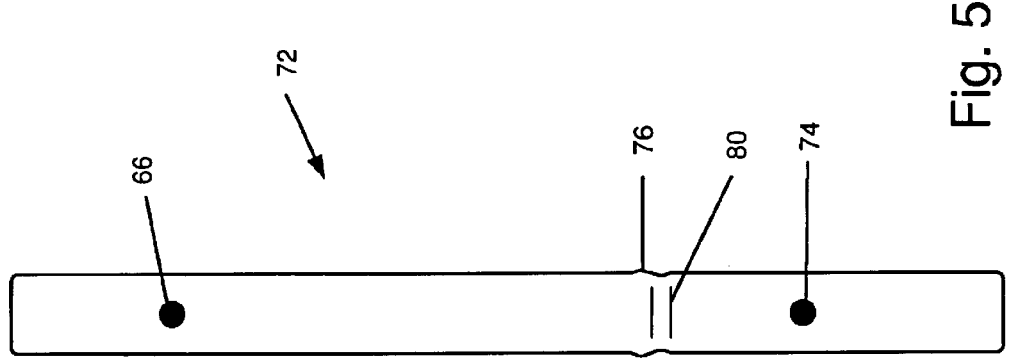

After a period of time, the acoustic energy 68 emitted by the acoustic transmitter 66 has traveled along the body 70 of the acoustic logging tool 72, as shown in FIG. 5. The flexural mode of the acoustic energy 76 has experienced more amplitude attenuation than the compressional mode 80. The inventors discovered that as acoustic energy propagates in the flexural mode, a mode conversion takes place, wherein the flexural mode is converted to compressional mode as it propagates away from the transmitter. At the end these two modes of acoustic energy are received by the acoustic receiver 74 and, if left unattenuated, interfere with the measurements and calculations of the formation acoustic velocity.

Figure 6:
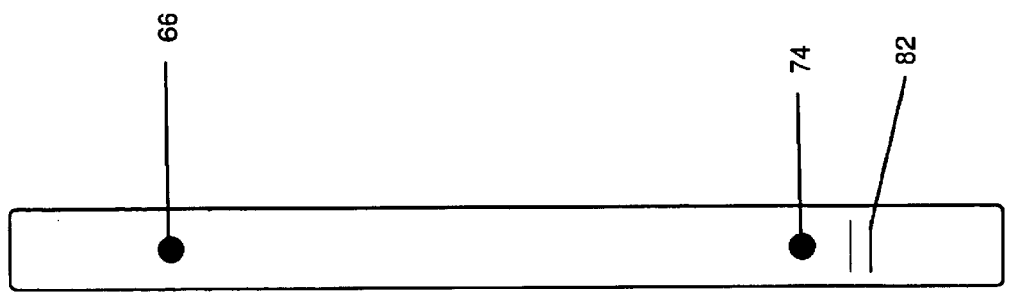

Another source of interfering acoustic energy is acoustic noise energy 82 that travels along the inside and the outside of the acoustic logging tool body 70, as shown in FIG. 6. This noise energy 82, which is caused, for example, by drilling, mud fluid flow, the actions of other tools, or contact between the drill string and the borehole, also interferes with the measurements and calculations of the formation acoustic velocity.

The invention uses two relatively broadband acoustic energy absorbers to absorb acoustic energy from the acoustic transmitter and acoustic noise present in the body of the acoustic logging tool. The first broadband acoustic energy absorber is located adjacent the acoustic transmitter and absorbs acoustic energy traveling in the flexural mode. The second broadband acoustic energy absorber is configured to absorb acoustic energy traveling in the compressional mode. Other configurations of acoustic energy absorbers could be configured to absorb other modes of acoustic energy transmission. Additional features of the invention further reduce the amount of acoustic energy that reaches the acoustic receiver by traveling along the body of the acoustic logging tool.

The preferred embodiment of the invention is incorporated in an LWD acoustic logging tool. The method and apparatus disclosed and claimed herein apply equally well to wireline acoustic logging tools or to any device requiring acoustic attenuation.

An acoustic logging tool 84, illustrated in FIG. 7, includes a tool body (collar for the case of an LWD tool) 86, an acoustic receiver or acoustic receiver array 88 and an acoustic transmitter or acoustic transmitter array 90. In the preferred embodiment a receiver array and a transmitter array are present. The teachings of the invention apply equally to all combinations of one or more transmitters and one or more receivers. A first absorber 92 for absorbing acoustic energy traveling in the flexural mode is located in a region of the acoustic logging tool 84 adjacent the acoustic transmitter array 90. A second absorber 94 for absorbing acoustic energy traveling in the compressional mode is located in a region of the acoustic logging tool adjacent the first absorber 92. The same absorber 94 is located on the opposite side of the first absorber 92 from the transmitter array 90. Additional absorption of acoustic energy is provided in a region 96 substantially coincident with the receiver array 88. Additional absorption of acoustic energy is provided in a region 98 adjacent to the receiver array 88.

In the preferred embodiment an insert is inserted into the tool body 86, as shown in FIG. 8. The insert is divided into three portions. A transmitter insert 100 extends from a connector 102, which allows connection of the acoustic logging tools to other tools or to the drill collar, to the transmitter array 90. An electronics insert 104 extends from a connector 106 at the opposite end of the tool from the transmitter insert 100 toward the center of the tool. A receiver insert 108 extends under the receiver array 88. For the case of the LWD tool a mud flow conduit 110 extends between the transmitter insert 100 and the receiver insert 108.

Figure 9:
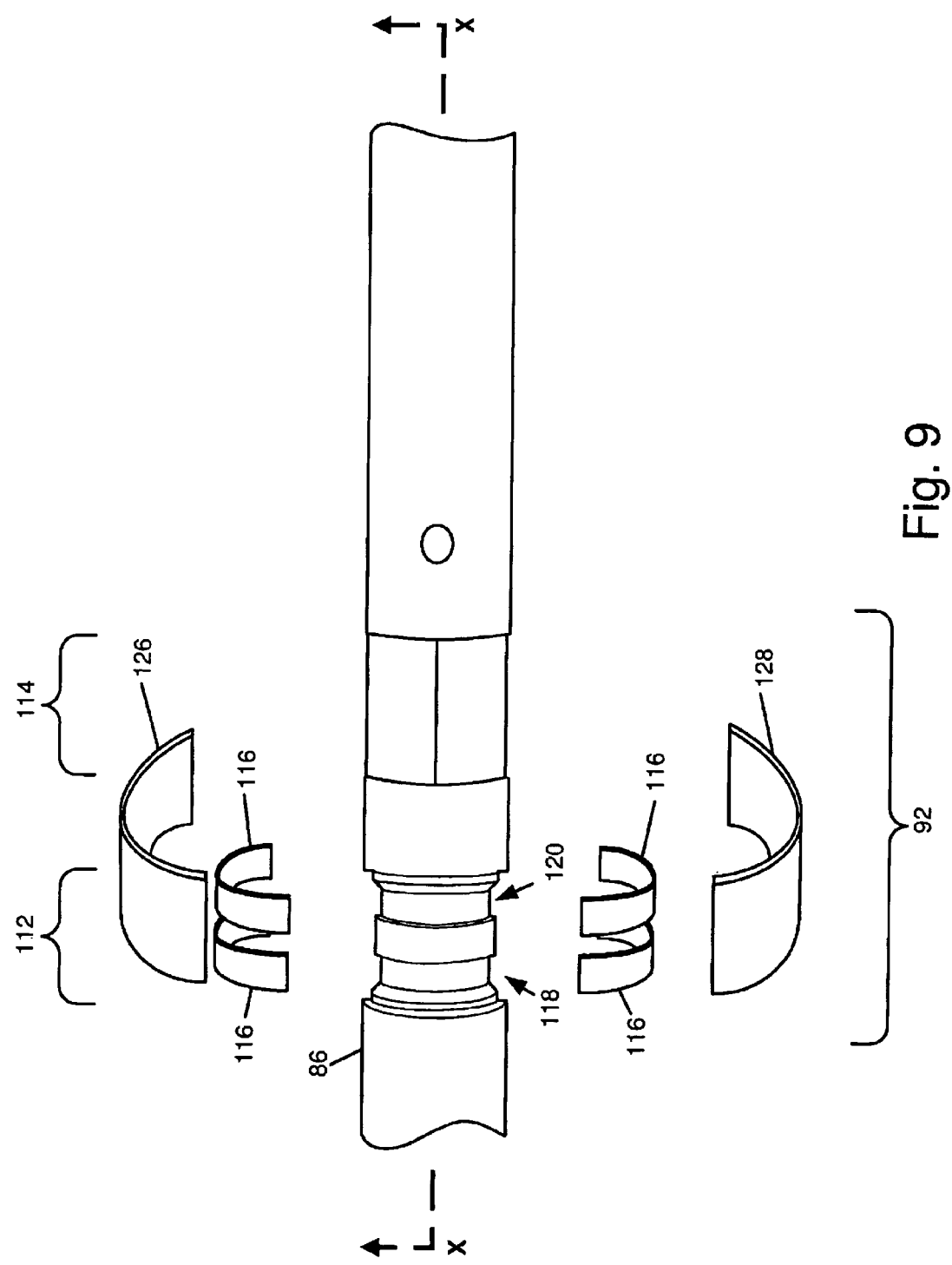
FIG. 9 is an exploded view of a portion of the acoustic logging tool of the present invention.
Figure 10:
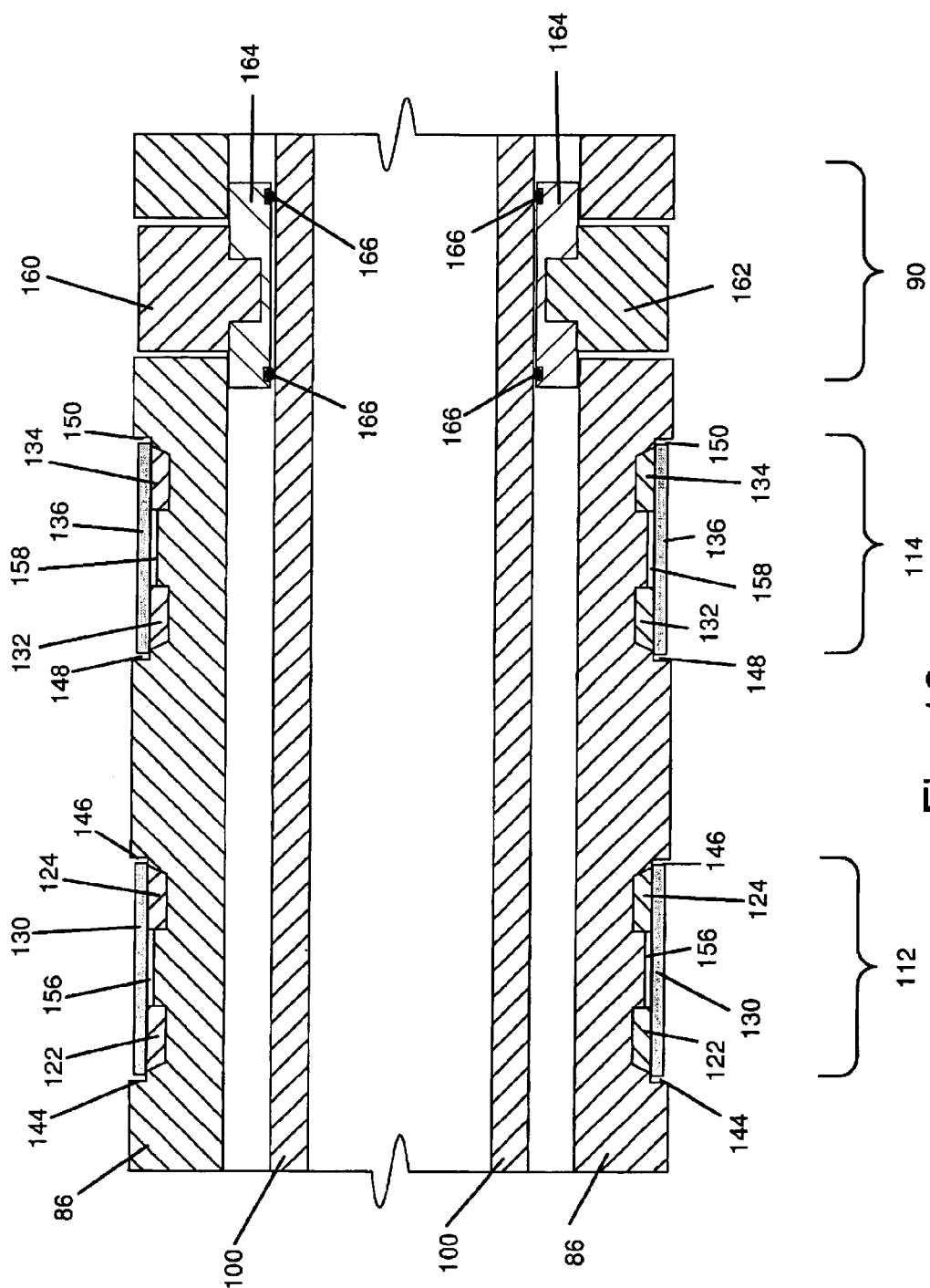
FIG. 10 is a section view of a portion of the acoustic logging tool of the present invention along lines X in FIG. 9.

The first absorber 92 comprises two absorbing sections 112 and 114, as illustrated in FIG. 9. Absorbing section 112 is shown in an exploded format to illustrate the construction of the absorbing section, and absorbing section 114 is shown in its finished form. Absorbing section 112 includes rings 116 of acoustic absorbing material. One or more rings constructed either as full rings or as half rings may be utilized. In the preferred embodiment two full rings 116 are utilized (shown as half rings on FIG. 9 for clarity). Rings 116 are placed into cavities 118 and 120 formed by the tool body 86 to form complete rings 122 and 124 of acoustic absorption material, as illustrated in FIG. 10. The rings 116 may be larger than cavities 118 and 120, respectively, so that they have to be compressed to fit into the cavities. Alternatively, the rings may be the same size as the cavities.

The width and the thickness of the rings 116 will vary depending on the application, i.e. it will depend on the size of the tool body. For example for a 6 ¾" outside diameter LWD tool the rings will be 0.5" to 4" wide and 0.1" to 1" thick. Preferably, the rings are 1" to 2" wide and 0.3" to 0.5" thick. More preferably, the rings are 1" to 1.5" wide and 0.3" to 0.4" thick.

Half bands 126 and 128 are placed around the tool body 86 and the rings 116, to form a full band 130, as shown in FIG. 10, in order to protect the acoustic absorbing material rings 116 from exposure to the drilling environment (drilling fluid, abrasion through wall contact, abrasion through contact with drill cuttings, dissolved gas in the drilling fluid etc.). Half bands 126 and 128 are joined together in any one of many ways known to those skilled in the art (welding, threaded inserts, nut and bolt joints etc.). In the preferred embodiment half bands 126 and 128 are welded together at a seam. The rings 122 and 124 may be compressed against the tool body 86 by the band 130. The final result has the appearance of absorbing section 114. Rings 132 and 134 are compressed and held in place by band 136.

The acoustic absorbing rings 122, 124, 132, 134 absorb acoustic energy traveling in the flexural mode, which, as discussed above, travel in a mode primarily affected by the outside surface of the tool body 86.

Compressing the rings 122, 124, 132, 134 against the tool body 86 increases the surface area of each ring that is in contact with the tool body, which increases the transfer of acoustic energy across the boundary from the tool body to the rings of absorbing material.

Those skilled in the art will appreciate that the transfer of acoustic energy from the tool body 86 to one of the acoustic absorbing rings 122, 124, 132, 134 will be enhanced by changing the acoustic impedance of the absorbing ring material to become closer in value to the acoustic impedance of the tool body material. The acoustic absorbing material can be constructed as a compound of a bonding agent, an elastomer and a high specific gravity material. Preferably the acoustic absorbing material is constructed as a compound of an elastomeric bonding agent and a high specific gravity material. More preferably, the acoustic absorbing material is constructed as a metal-loaded organic material. This material is a suspension of suitable metallic particles in an organic base, usually a bonding or setting material. The metallic particles are preferably brass, copper, gold, iron, lead, molybdenum, monel, nickel, nickel silver, platinum, tungsten or tungsten carbide: More preferably the metallic particles are relatively inert and of low cost such as brass, copper, lead, nickel and tungsten carbide. The bonding or setting material is preferably a thermoplastic (polyvinyl acetate, oleo-resin), a thermosetting (phenolic, resorcinol, epoxy), an elastomeric (natural rubber, butadiene-styrene, neoprene, acrylonitrile-butadiene, silicone) or an alloy formulated by resins from two or more different chemical groups (phenolic-neoprene rubber, phenolic-nitrile rubber, phenolic-polyvinyl butyral). More preferably the bonding material has high temperature resistance such as araldite, glass ceramic, rubber, phenolic epoxy, silicone resin. Even more preferably, the acoustic absorption material is a compound of rubber and tungsten particles or chips. Generally, the rubber is between 10 and 40 percent by weight of the compound. Preferably, the rubber is between 20 and 30 percent by weight of the compound. Generally, the tungsten particles are within a range of 10 to 300 mesh. Preferably, the tungsten particles are within a range of 50 to 250 mesh. Further, even finer tungsten particles (with a mesh greater than 250) could be used.

Figure 11:
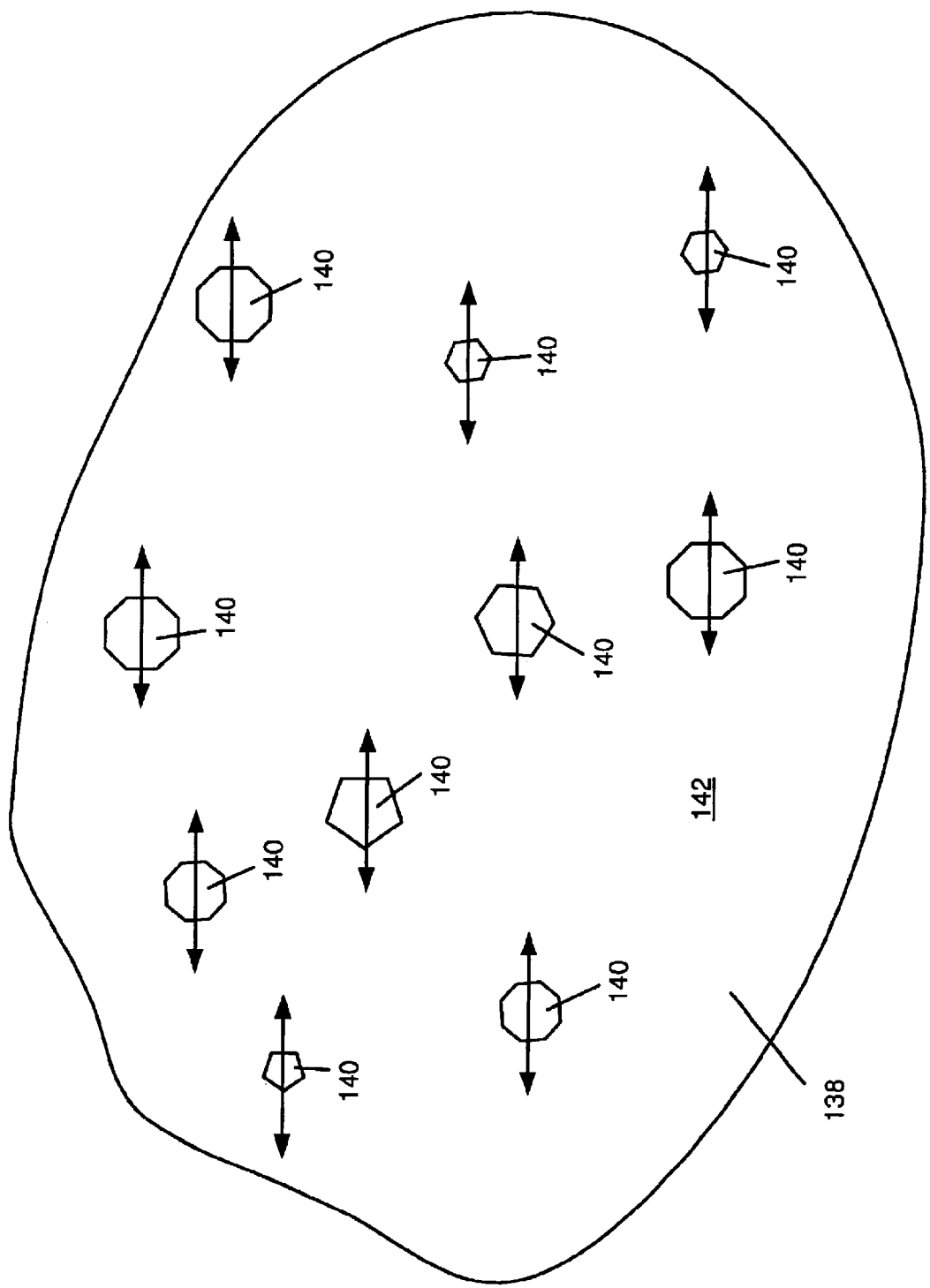
FIG. 11 is a section view of the acoustic absorption material according to the present invention.

Acoustic absorption elements 138 made of the metallic particles/bonding material compound described above have metallic particles 140 distributed substantially uniformly throughout a bonding material matrix 142, as shown in FIG. 11. When acoustic energy impinges on an acoustic absorption element, the acoustic energy drives the bonding material 142 and each metallic particle 140 in the direction the acoustic energy is traveling. Since the metallic particles 140 have a greater density than the bonding material 142, the metallic particles 140 will also have greater inertia than the bonding material 142 in its immediate vicinity. Consequently, the metallic particles 140 will tend to resist the acceleration imparted by the acoustic energy more than the bonding material 142. The difference in inertia produces a relative motion between the bonding material 142 and the metallic particles 140. The relative motion produces friction, which produces heat in both the bonding material 142 and the metallic particles 140. The law of conservation of energy requires that the acoustic energy be diminished by the amount of energy expended as heat. Thus, some of the acoustic energy is converted into heat and dissipated outside the absorption element 138. The result is that some of the acoustic energy is absorbed by the absorption element 138.

In addition to the absorption provided by the acoustic absorption elements 122, 124, 132, 134, other acoustic isolation features are present in the tool which tend to force the flexural component of the acoustic energy to pass through the acoustic absorption elements, as illustrated in FIG. 10. As discussed above, the flexural component of acoustic energy tends to travel in a mode that is primarily affected by the outer surface of the tool body 86. To prevent acoustic energy from diverting around the acoustic absorption elements through the bands 130 and 136, the bands have minimal physical contact with the tool body. Gaps 144 and 146 substantially separate band 130 from the tool body 86 and gaps 148 and 150 substantially separate band 136 from the tool body 86. Consequently, there is substantially no path for the acoustic energy to follow through bands 130 and 136.

Figure 12:
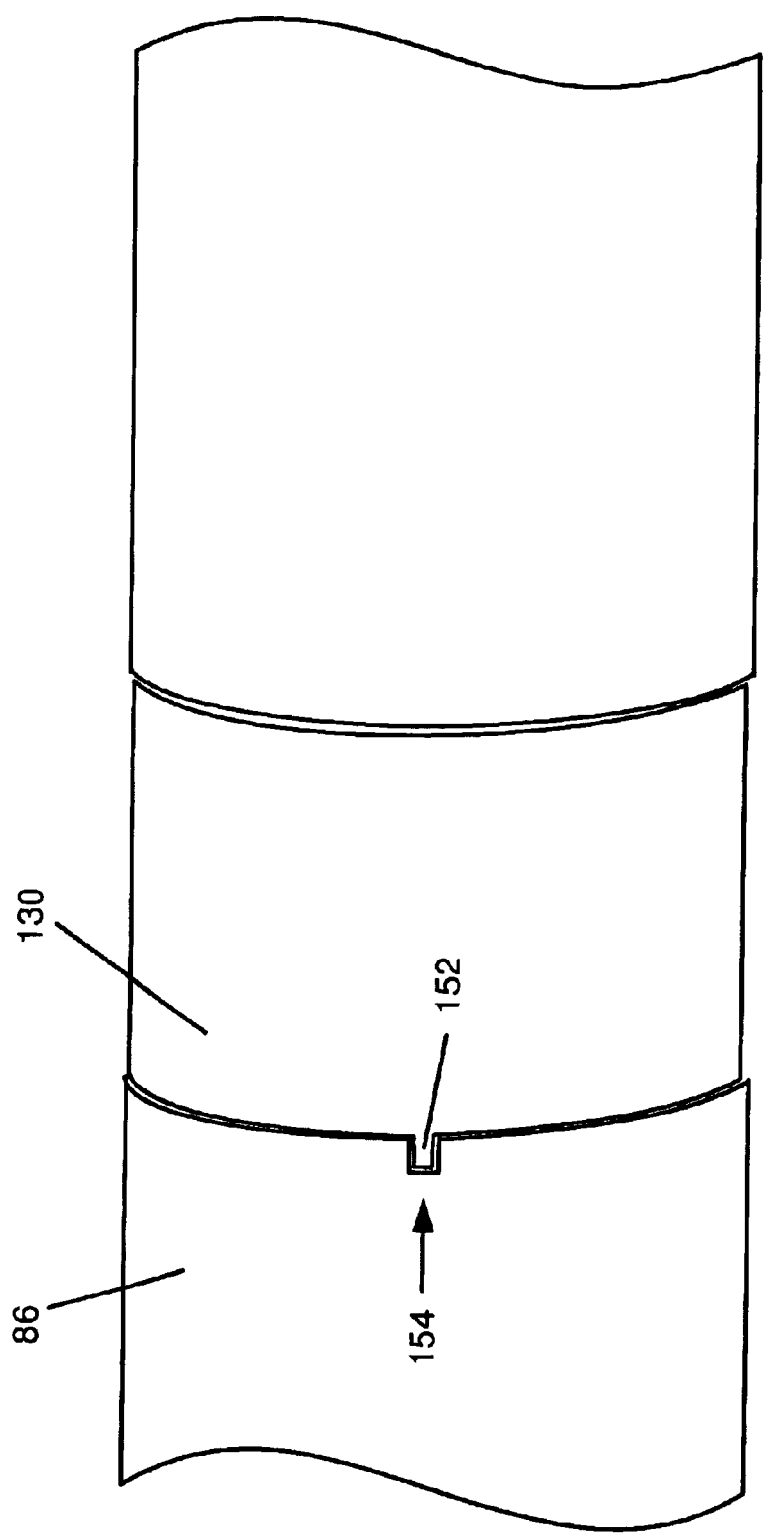
FIG. 12 is a perspective view of a portion of the acoustic logging tool of the present invention.

Further, as shown in FIG. 12, while a key 152 in band 130 fits into a key slot 154 on the tool body 86 to prevent the band from rotating relative to the tool body, the key 152 presents a very small contact area to the tool body, thus providing for minimal acoustic transmission through the contact surface Additional acoustic isolation is provided by gap 156 between acoustic absorption elements 122 and 124 and between band 130 and tool body 86, as shown in FIG. 10. The gap 156 is small enough so that if the band is struck from the outside, the tool body material beneath the gap will support the band. The same acoustic isolation and support is provided by gap 158 with respect to band 136 and tool body 86.

Similar acoustic isolation features reduce the transfer of acoustic energy from the acoustic transmitter array 90 to the tool body 86 or the transmitter insert 100. The transmitter array includes one or more transmitters (two are shown 160 and 162). The transmitters 160 and 162 are positioned so that there is substantially no contact between the transmitters 160 and 162 and the tool body 86. Further, the transmitters 160 and 162 are mounted on a ring 164 which has minimal contact either with the tool body 86 or the transmitter insert 100. Additionally, O-rings 166 separate the ring 164 from the transmitter insert. Consequently, the transmitters 160 and 162 are substantially acoustically isolated from the tool body 86 and the transmitter insert 100 by one or more air gaps.

The acoustic transmitters 160 and 162 are positioned on opposite sides of the tool body 86 and transmitter insert 100, as shown in FIG. 10. The transmitters 160 and 162 are exposed to the pressure in the borehole while the pressure inside the tool body remains substantially atmospheric. The pressure exerted on the transmitters will cause them to exert an inward pressure on the ring 164. Since the transmitters 160 and 162 are on opposite sides of ring 164, the pressure they exert on the ring 164 will tend to cancel. Consequently, the ring 164 will not move relative to the tool body 86 and the transmitter insert 100 and the acoustic isolation between the ring 164 and the tool body 86 and transmitter insert 100 will be maintained. If one of the transmitters 160 and 162 is not installed in the tool, a plug exposed to the pressure outside the tool body is installed to provide the counterbalance for the force on the ring exerted by the transmitter that is installed. In the preferred embodiment the rings are designed not to contact the insert even when they are under load.

Further isolation is provided by the design of the tool body/receiver and/or transmitter region. It is well known to those skilled in the art that in drilling or logging deviated or horizontal holes the logging tool will bend and deform to follow the curvature of the borehole. The gap between the transmitters and receivers and the body are large enough that the receivers and transmitters are substantially isolated from the tool body, even when the cavity of the tool body in which they are inserted is deformed due to drilling or logging stresses.

Figure 13:
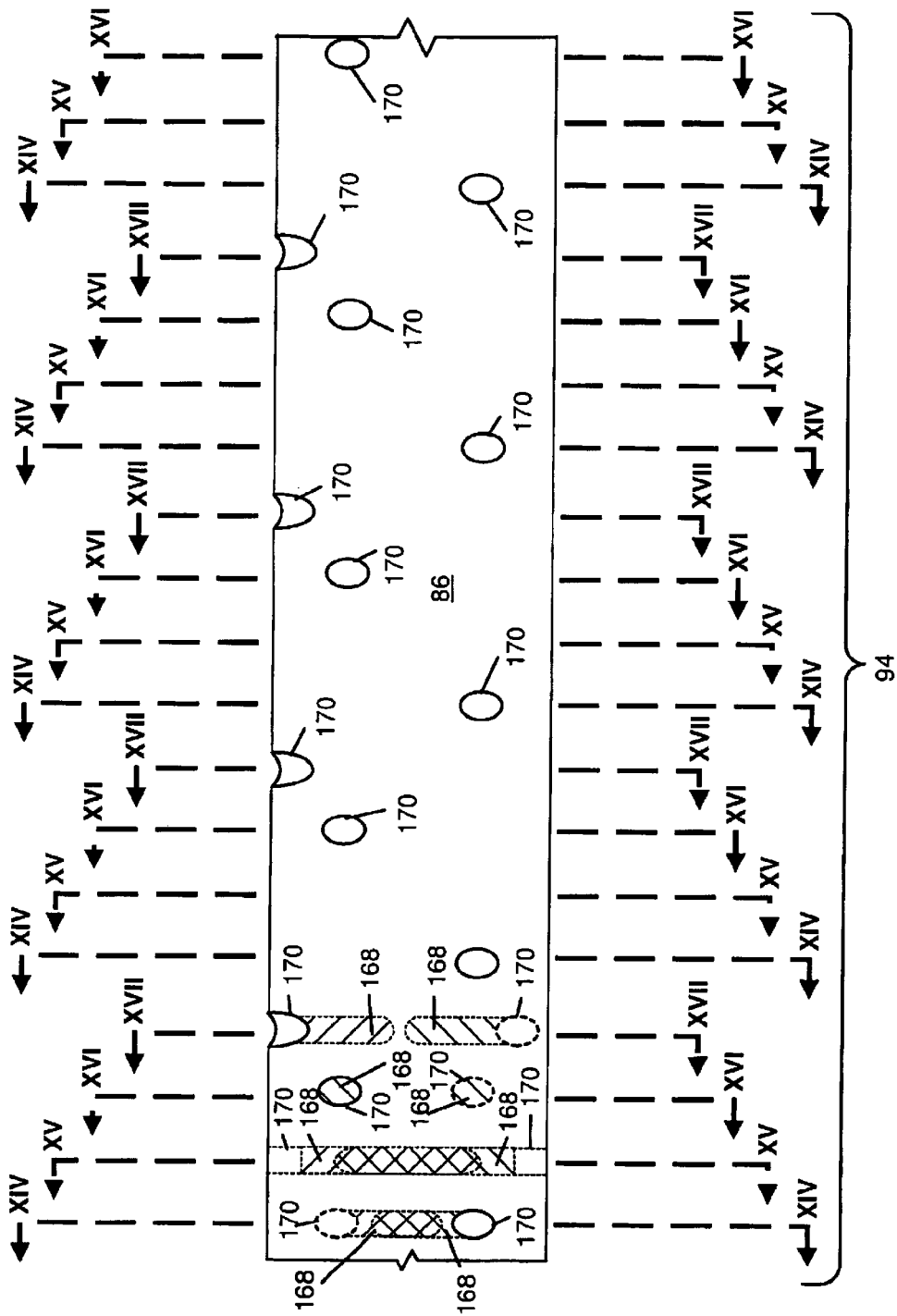
FIG. 13 is a perspective view of a portion of the acoustic logging tool of the present invention.
Figure 14:
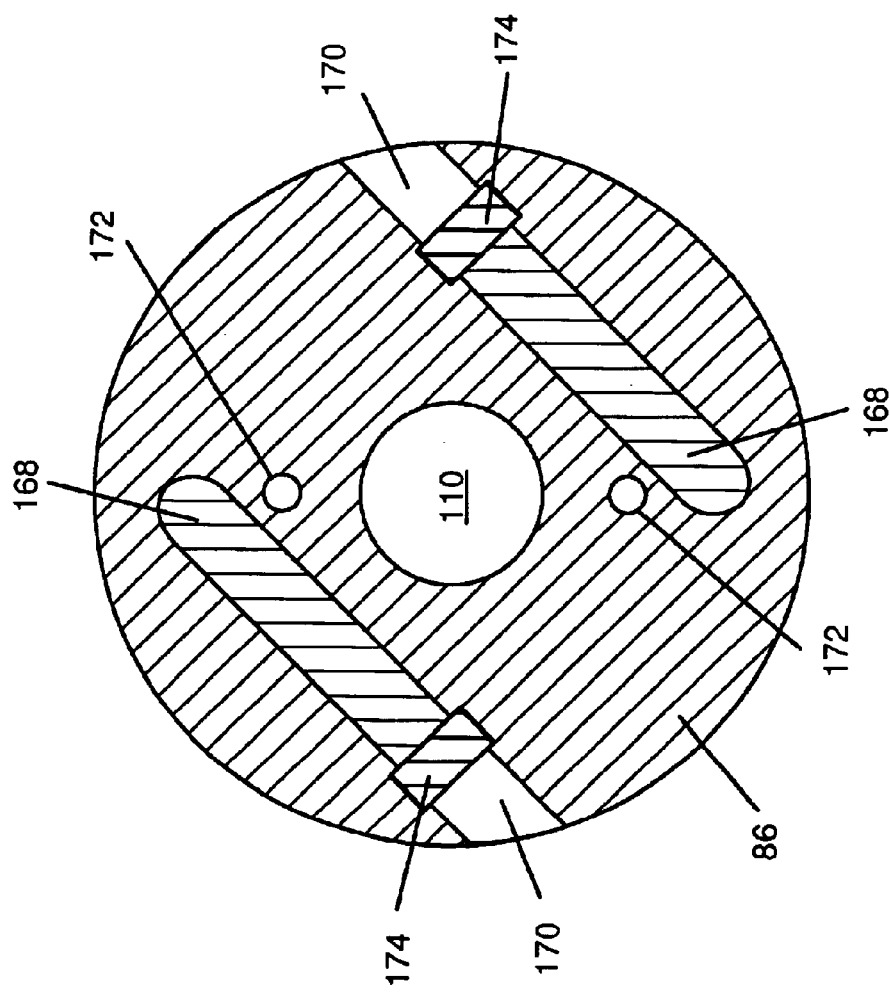
FIG. 14 is a section view of the acoustic logging tool of the present invention along lines XIV on FIG. 13.
Figure 15:
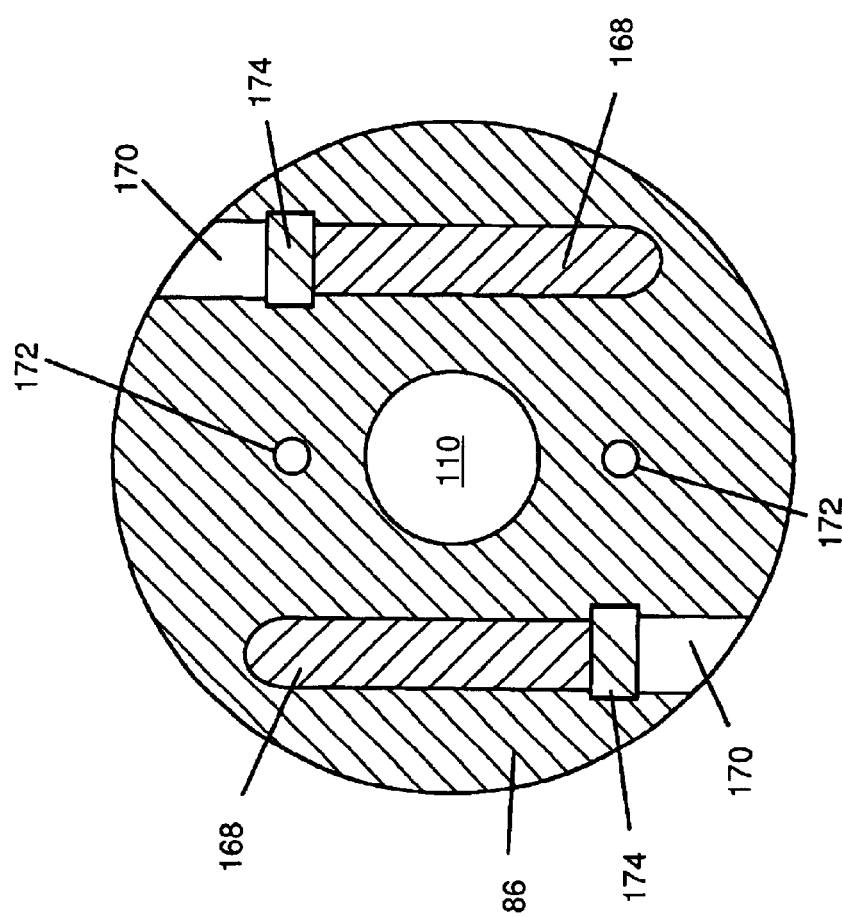
FIG. 15 is a section view of the acoustic logging tool of the present invention along lines XV on FIG. 13.
Figure 16:
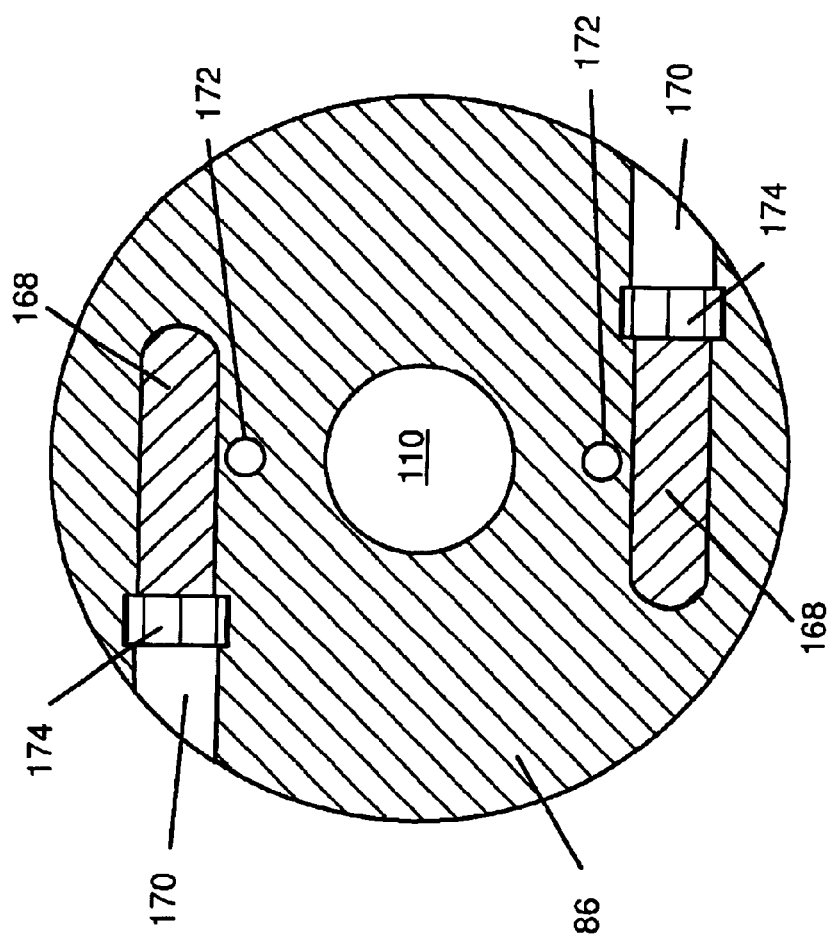
FIG. 16 is a section view of the acoustic logging tool of the present invention along lines XVI on FIG. 13.
Figure 17:
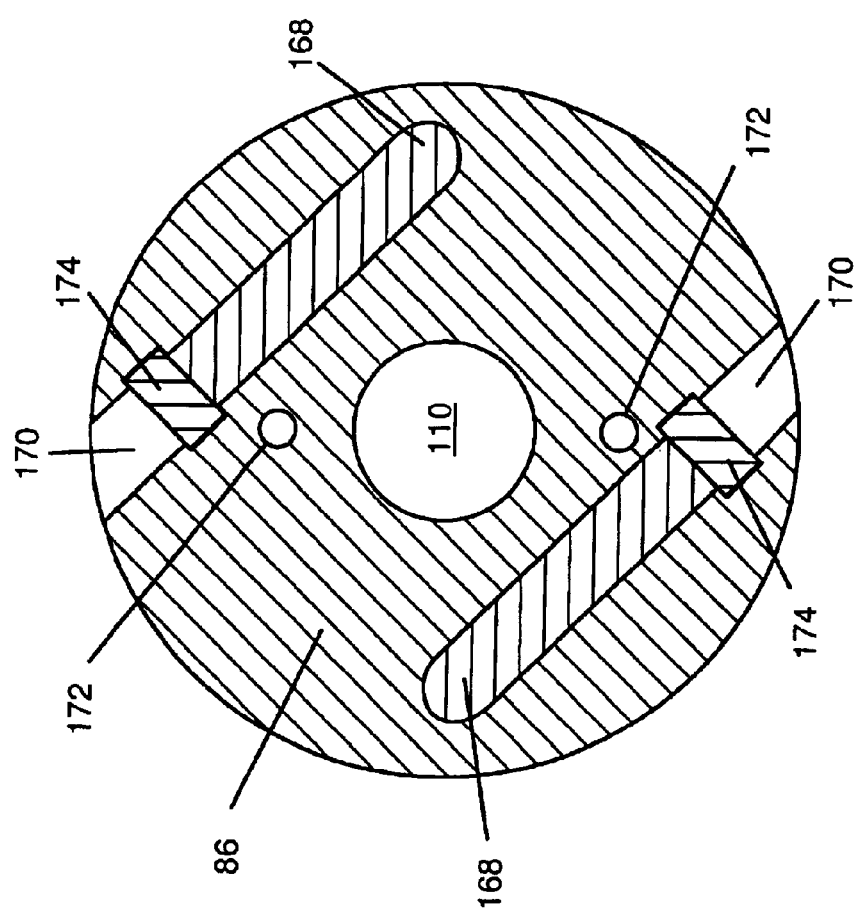
FIG. 17 is a section view of the acoustic logging tool of the present invention along lines XVII on FIG. 13.

The second absorber comprises slugs 168 of acoustic absorption material inserted into cavities 170, as shown in FIG. 13. For simplicity, the slugs are shown in FIG. 13 for a representative portion of the second absorber. The pattern of slugs illustrated in FIG. 13 repeats along the length of the second absorber, as discussed below.

In the preferred embodiment the second absorber includes sets of slugs 168 of absorption material. Each set includes two slugs 168 inserted into two parallel cavities 170 at one of four orientations, as shown in FIGS. 14, 15, 16 and 17. In the first orientation, shown in FIG. 14, the slugs 168 are inserted into cavities 170 at an angle to a plane through the centerline of the mud flow conduit 110 and through the centerlines of wiring conduits 172. The slugs are secured in place by plugs 174. In the second orientation, shown in FIG. 15, the slugs 168 are inserted into cavities 170 that are substantially parallel to the plane through the centerline of the mud flow conduit 110 and through the centerlines of wiring conduits 172. In the third orientation, shown in FIG. 16, the slugs 168 are inserted into cavities 170 that are substantially perpendicular to the plane through the centerline of the mud flow conduit 110 and through the centerlines of wiring conduits 172. In the orientation illustrated in FIG. 16, the slugs 168 and cavities 170 are shorter than in the other orientations because it is necessary for the slugs 168 and cavities 170 to avoid the wiring conduits 172. In the fourth orientation, illustrated in FIG. 17, the slugs 168 are inserted into cavities 170 that are at an angle to the plane through the centerline of the mud flow conduit 110 and through the centerlines of wiring conduits 172 that is roughly complementary to that of the slugs and cavities in FIG. 14.

The slug orientations described above are arranged in a repeating sequence in the second absorber. If a line were drawn through the second absorber from the end of the second absorber farthest from the transmitter array toward the transmitter array and parallel to the wall of the tool body, a portion of the second absorber containing slugs in the first orientation would be encountered first. Second, the line would encounter a portion of the second absorber containing slugs in the second orientation. Third, the line would encounter a portion of the second absorber containing slugs in the third orientation. Fourth, the line would encounter a portion of the second absorber containing slugs in the fourth orientation. The line would then repeat the pattern of encountering portions of the second absorber containing slugs in the first, second, third and fourth orientations until the line had encountered multiple portions of the second absorber.

Figure 18:
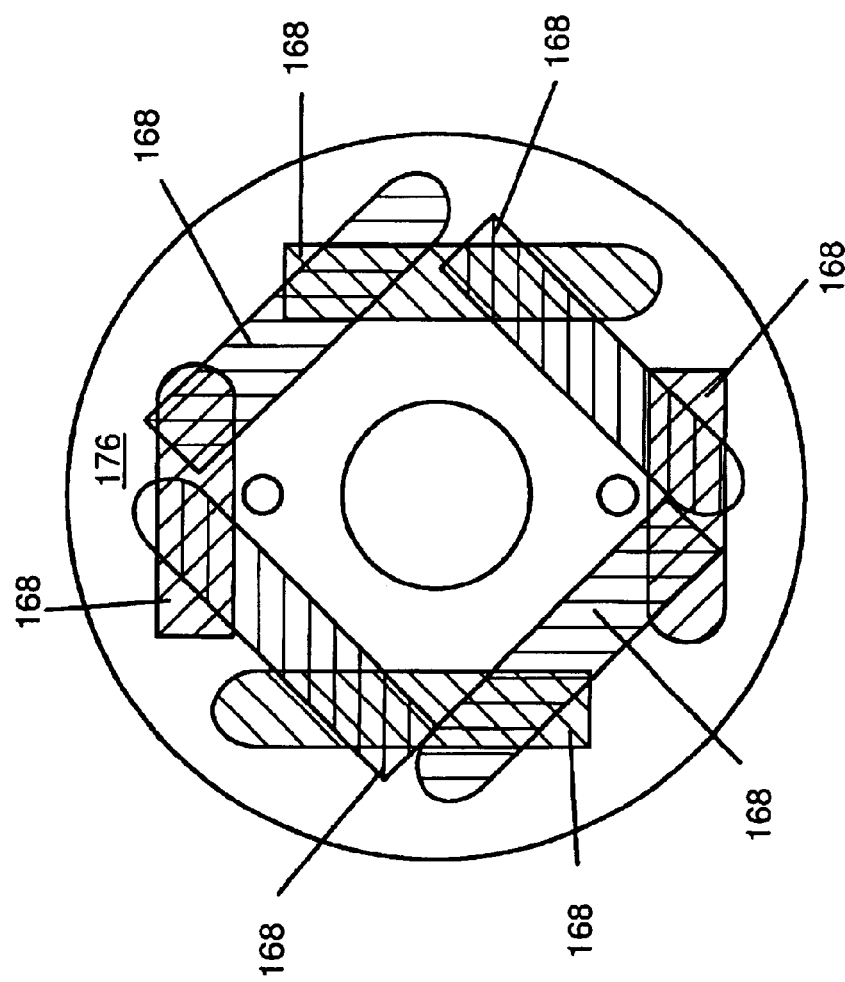
FIG. 18 is a view of the sections of FIGS. 14, 15, 16 and 17 projected onto a plane.

The slugs are oriented in the four different orientations in order that a line passing through four portions of the second absorber, as described above, in an annulus centered on a centerline through the tool body will go through at least one of the slugs, as illustrated in FIG. 18. The slugs in the four orientations are generally arranged so that when they are projected onto a plane perpendicular to the tool body's centerline they cover between 10 and 70 percent of the intersection of the tool body and the plane 176. Preferably, the projections of the slugs onto the plane cover between 30 and 50 percent of the intersection of the tool body and the plane. More preferably, the projections of the slugs onto the plane cover between 30 and 35 percent of the intersection of the tool body and the plane.

Further, the slugs are oriented, as shown in FIG. 18, so that they cover the inside portion of the tool body where the compressional acoustic energy travels. Consequently, the slugs of the second absorber will absorb compressional acoustic energy.

The embodiment of the second absorber described above can be varied in a number of ways and still be within the scope of the invention. For example, the size and number of slugs can be increased or decreased. The number of orientations can be increased or decreased. Other variations are within the scope of the invention as long as the projections of the slugs onto a plane perpendicular to the centerline of the tool body cover a percentage of the intersection of the tool body and the plane specified above.

The first absorber and second absorber will absorb much of the acoustic energy traveling through the tool body from the transmitter array to the receiver array. Rings of acoustic absorption material in the receiver array provide additional absorption. The rings in the receiver array are effective at absorbing residual flexural acoustic energy or compressional acoustic energy. Consequently, they may be thought of as being part of the first absorber, part of the second absorber or as a third absorber separate from the other two. Similarly, the slugs could also be placed in the receiver array to assist with absorbing acoustic energy. In general any combination of the first absorber and the second absorber can be used in the receiver array to assist with the absorption of the acoustic energy reaching the receivers through the body of the tool.

Figure 19:
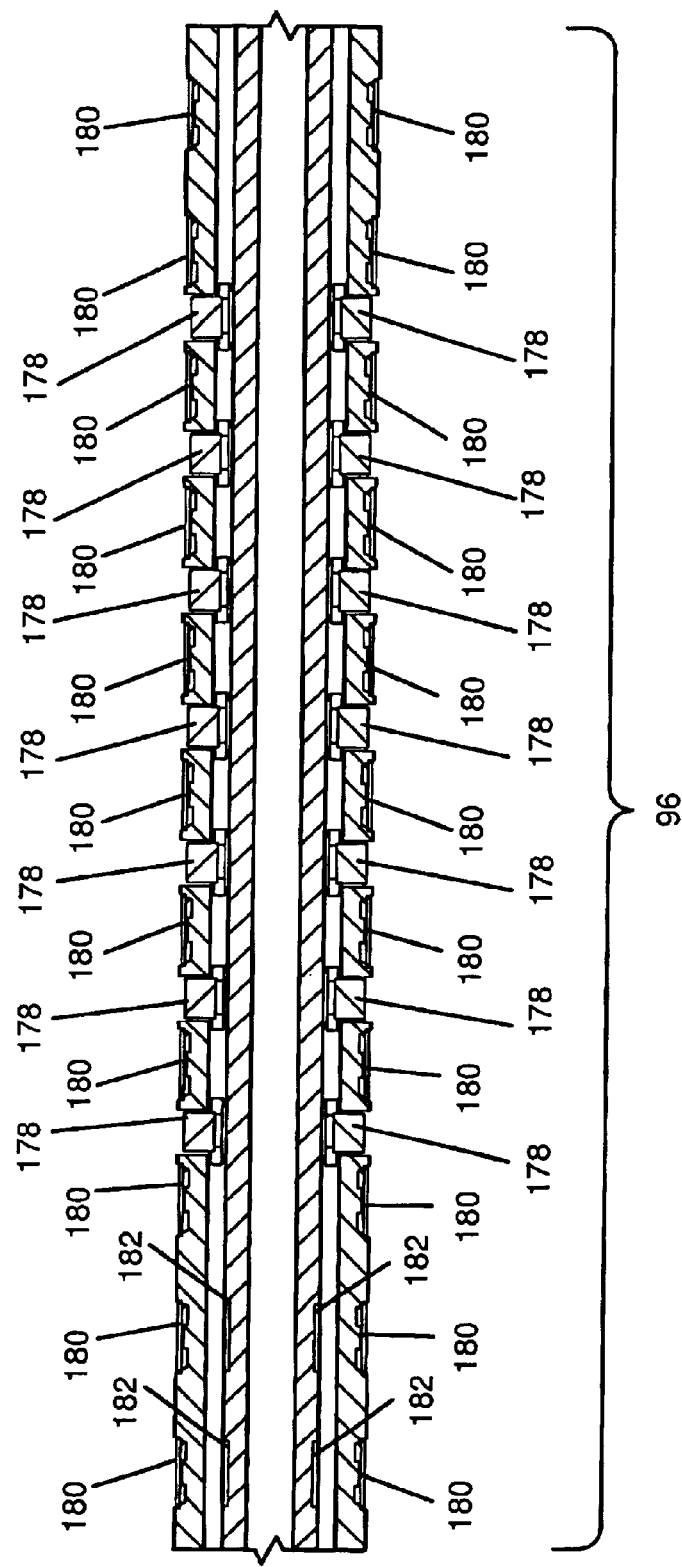
FIG. 19 is a section of a portion of the acoustic logging tool of the present invention.

In the preferred embodiment the receiver array includes seven pairs of receivers 178, as shown in FIG. 19. The additional absorption region 96 includes acoustic absorption rings 180 between each receiver 178. In addition, acoustic absorption rings 180 are located on the end of the additional absorption region 96 that is nearest the transmitter array that provide acoustic absorption before the acoustic energy reaches the first receiver. The additional absorption region 96 includes acoustic absorption rings on the end that is farthest from the transmitter array which absorb acoustic energy traveling along the tool body from the direction of the end of the tool body opposite the transmitter array.

The additional absorption region 96 includes two rings 182 of acoustic absorption material installed on the receive insert that absorb acoustic noise traveling through the insert.

Figure 20:
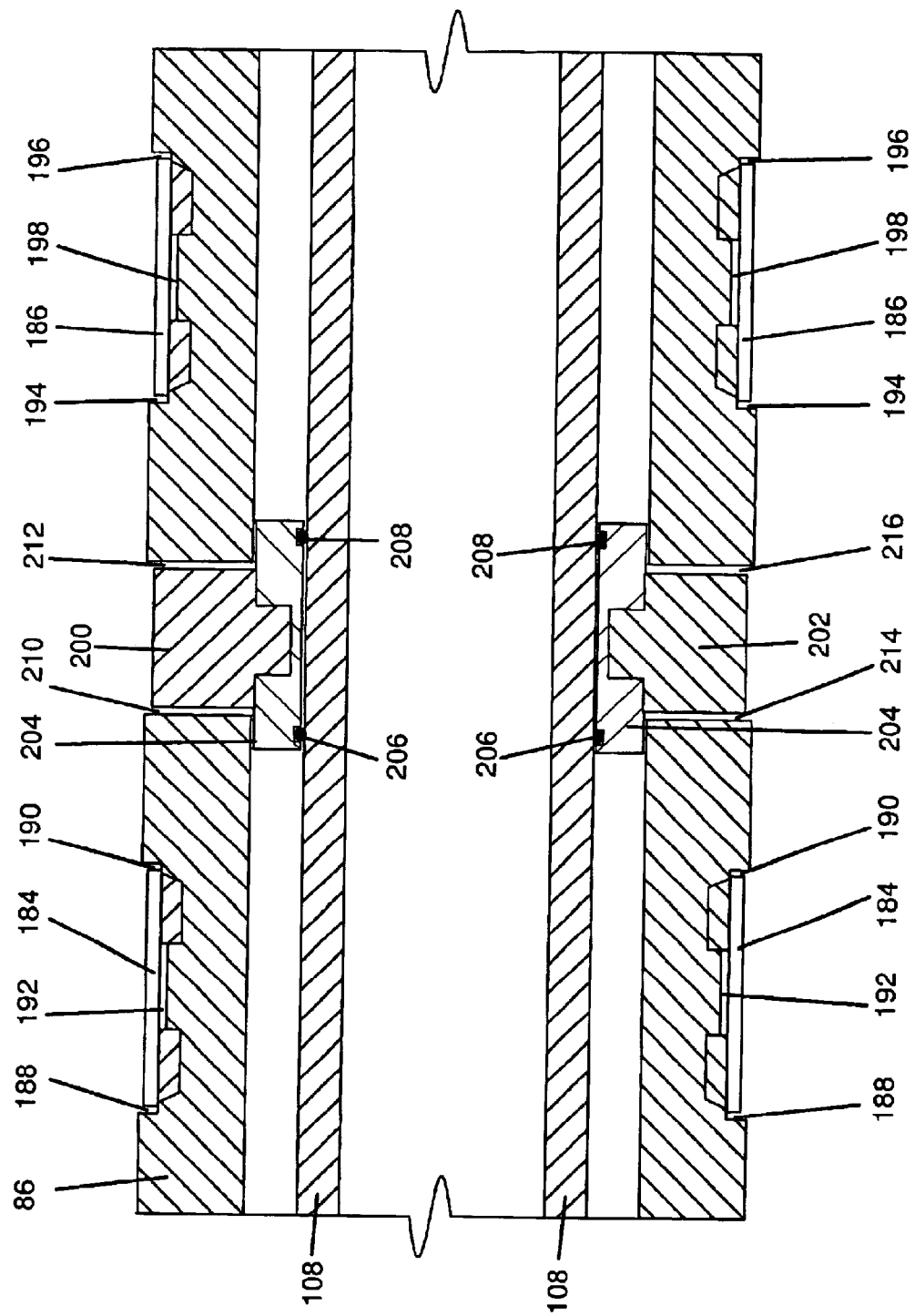
FIG. 20 is a section of a portion of the acoustic logging tool of the present invention.

The receiver array has similar acoustic isolation features to those present in the transmitter array, as illustrated in FIG. 20. There is substantially no contact between bands 184, 186 and the tool body 86 because of gaps 188, 190, 192 and 194, 196, 198, respectively. Each pair of receivers 200, 202 is supported by a ring 204 which is supported by receiver insert 108 and separated from the receiver insert by O-rings 206 and 208. There are air gaps 210, 212 and 214, 216 between the receivers 200, 202 and the tool body 86, respectively. Consequently, the receivers are substantially acoustically isolated from the tool body and the receiver insert by one or more air gaps.

The acoustic receivers 200 and 202 (as well as the other pairs of acoustic receivers which are not shown in FIG. 20) are positioned on opposite sides of the tool body 86 and receiver insert 108, as shown in FIG. 20. The receivers 200 and 202 are exposed to the pressure in the borehole while the pressure inside the tool body remains at substantially atmospheric. The pressure exerted on the receivers will cause them to exert an inward pressure on the ring 204. Since the receivers 200 and 202 are on opposite sides of ring 204, the pressure they exert on the ring 204 will tend to cancel. Consequently, the ring 204 will not move relative to the tool body 86 and the receiver insert 108 and acoustic isolation between the ring 204 and the tool body 86 and receiver insert 108 will be maintained. If one of the receivers 200 and 202 is not installed in the tool, a plug exposed to the pressure outside the tool body is installed to provide the counterbalance for the force on the ring exerted by the receiver that is installed. In the preferred embodiment the rings are designed not to contact the insert even when they are under load.

The foregoing describes preferred embodiments of the invention and is given by way of example only. The invention is not limited to any of the specific features described herein, but includes all variations thereof within the scope of the appended claims. For example, the transmitter array may comprise a different number of transmit transducers than described. The receiver array may comprise a different number of receive transducers than described.

What is claimed is:

1. An acoustic logging tool comprising:
   an elongated body;
   a transmitter adapted to transmit an acoustic signal, at least a portion of which propagates through said body in a flexural mode and a compressional mode;
   a first absorber for absorbing the signal propagating in the flexural mode; and
   a second absorber for absorbing the signal propagating in the compressional mode.

2. The tool of claim 1 wherein said first absorber is disposed on said body in a position in between said transmitter and said second absorber.

3. The tool of claim 1 wherein said first absorber comprises:
   a ring of acoustic absorbing material disposed circumferentially about said body; and
   a band of material at least partially surrounding said ring of acoustic absorbing material and adapted to compress said acoustic absorbing material onto said body.

4. The tool of claim 1 wherein said second absorber comprises:
   a plurality of cavities formed into said body; and
   a plurality of slugs disposed within said cavities.

5. The tool of claim 4 wherein said cavities are arranged into sets, wherein each set comprises two parallel cavities oriented at an angle to a plane through the centerline of said body.

6. The tool of claim 5 wherein each set of cavities is oriented at a different angle to the plane through the centerline of the body than adjacent sets of cavities.

7. An acoustic logging tool comprising:
   an elongated body;
   a transmitter adapted to transmit an acoustic signal, wherein the acoustic signal initially propagates through said body in a flexural mode and then converts to a compressional mode as the signal moves along said body;
   a first absorber located on said body adjacent to said transmitter; and
   a second absorber located on said body so that said first absorber is between the second absorber and said transmitter, wherein said first absorber is adapted to attenuate the signal propagating in the flexural mode and said second absorber is adapted to attenuate the signal propagating in the compressional mode.

8. The tool of claim 7 wherein said first absorber comprises:
   a ring of acoustic absorbing material disposed circumferentially about said body; and
   a band of material at least partially surrounding said ring of acoustic absorbing material and adapted to compress said acoustic absorbing material onto said body.

9. The tool of claim 7 wherein said second absorber comprises:
   a plurality of cavities formed into said body; and
   a plurality of slugs disposed within said cavities.

10. The tool of claim 9 wherein said cavities are arranged into sets, wherein each set comprises two parallel cavities oriented at an angle to a plane through the centerline of said body.

11. The tool of claim 10 wherein each set of cavities is oriented at a different angle to the plane through the centerline of the body than adjacent sets of cavities.

12. A method for attenuating an acoustic signal that is propagating in a flexural mode and a compressional mode through a body, the method comprising:
   attenuating the portion of the signal propagating in the flexural mode with a first absorber; and
   attenuating the portion of the signal propagating in the compressional mode with a second absorber.

13. The method of claim 12 wherein said first absorber attenuates a signal in the flexural mode by propagating the signal across a ring of acoustic absorbing material disposed circumferentially about the body and compressed onto the body by a band of material at least partially surrounding the ring of acoustic absorbing material.

14. The method of claim 12 wherein said second absorber attenuates a signal in the compressional mode by propagating the signal across a plurality of slugs disposed within cavities in the body.

15. The method of claim 14 wherein the cavities are arranged into sets, wherein each set comprises two parallel cavities oriented at an angle to a plane through the centerline of the body.

16. The method of claim 15 wherein each set of cavities is oriented at a different angle to the plane through the centerline of the body than adjacent sets of cavities.

17. The method of claim 12 wherein the signal propagates across the first absorber before propagating across the second absorber.

18. A method for attenuating an acoustic signal propagating along an elongated body between a transmitter and a receiver wherein the signal primarily propagates in a flexural mode proximal to the transmitter and undergoes a mode conversion as it propagates along the body so that the signal primarily propagates in a compressional mode proximal to the receiver, the method comprising:

attenuating the flexural mode of the signal with a first absorber;

attenuating the compressional mode of the signal with a second absorber.

19. The method of claim 18 wherein said first absorber attenuates a signal in the flexural mode by propagating the signal across a ring of acoustic absorbing material disposed circumferentially about the body and compressed onto the body by a band of material at least partially surrounding the ring of acoustic absorbing material.

20. The method of claim 18 wherein said second absorber attenuates a signal in the compressional mode by propagating the signal across a plurality of slugs disposed within cavities in the body.

21. The method of claim 20 wherein the cavities are arranged into sets, wherein each set comprises two parallel cavities oriented at an angle to a plane through the centerline of the body.

22. The method of claim 21 wherein each set of cavities is oriented at a different angle to the plane through the centerline of the body than adjacent sets of cavities.

23. The method of claim 18 wherein the signal propagates across the first absorber before propagating across the second absorber.

* * * * *